(12) United States Patent
Miyajima

(10) Patent No.: US 8,842,306 B2
(45) Date of Patent: Sep. 23, 2014

(54) IMAGE FORMING APPARATUS, CONTROL METHOD THEREOF, AND STORAGE MEDIUM

(71) Applicant: Canon Kabushiki Kaisha, Tokyo (JP)

(72) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/095,272

(22) Filed: Dec. 3, 2013

(65) Prior Publication Data

US 2014/0160506 A1   Jun. 12, 2014

(30) Foreign Application Priority Data

Dec. 7, 2012 (JP) ................. 2012-268807

(51) Int. Cl.
*G06F 3/12* (2006.01)
*G06K 15/00* (2006.01)
(52) U.S. Cl.
CPC ................... *G06K 15/403* (2013.01)
USPC .............. 358/1.13; 358/1.9; 358/1.1

(58) Field of Classification Search
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

FOREIGN PATENT DOCUMENTS

JP    2005-107322 A    4/2005
JP    2005-206298 A    8/2005

*Primary Examiner* — Thierry L Pham
(74) *Attorney, Agent, or Firm* — Fitzpatrick, Cella, Harper & Scinto

(57) ABSTRACT

An image forming apparatus forms an image on a sheet, executes post-processing for the sheet, changes a mode of the image forming apparatus from a first mode of permitting formation of an image to a second mode of restricting formation of an image and permitting the post-processing unit to execute post-processing, sets, as a condition for changing the mode from the second mode to the first mode, a first condition for changing the mode without a user instruction for changing the mode from the second mode to the first mode or a second condition for changing the mode in accordance with the user instruction, and controls to change the mode from the second mode to the first mode in accordance with the set condition.

10 Claims, 7 Drawing Sheets

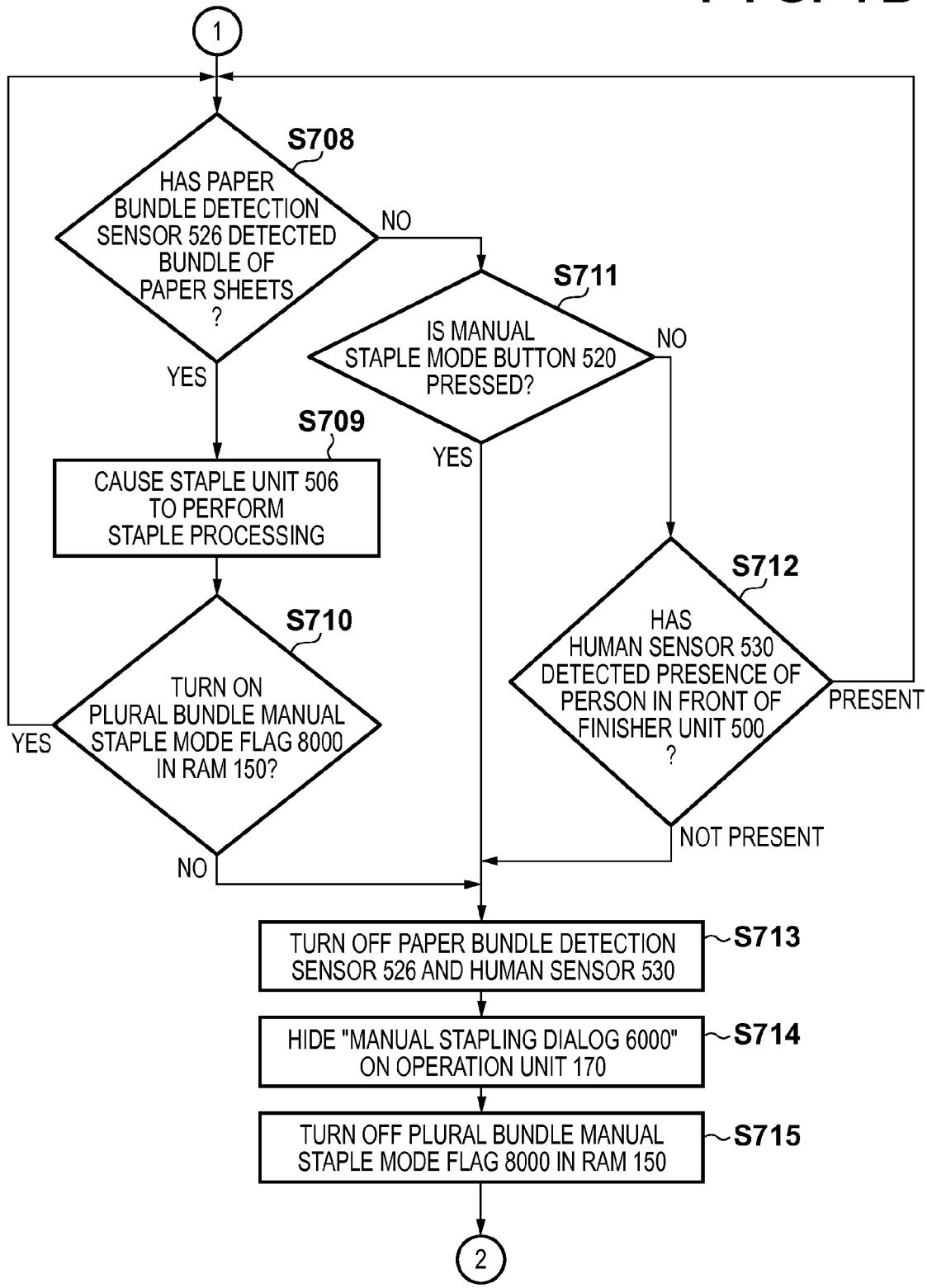
F I G. 7B

IMAGE FORMING APPARATUS, CONTROL METHOD THEREOF, AND STORAGE MEDIUM

BACKGROUND OF THE INVENTION

1. Field of the Invention

The present invention relates to an image forming apparatus, a control method thereof, and a storage medium.

2. Description of the Related Art

Conventionally, a general image forming apparatus including a post-processing apparatus such as a stapler is configured to convey printing paper sheets one by one, on which the image forming apparatus forms images by itself, and staple a plurality of printing paper sheets after they are stacked on a tray on the post-processing apparatus.

Japanese Patent Laid-Open No. 2005-206298 has proposed an image forming apparatus in which the user inserts a bundle of printing paper sheets onto the processing tray of a finisher and which performs staple processing for the bundle of paper sheets inserted onto the processing tray. This function will be referred to as manual stapling. Some apparatus is configured to set, as the execution timing of this manual stapling, the time point when a bundle of papers is detected by a paper bundle detection sensor instead of the time point when a staple button is pressed. For example, Japanese Patent Laid-Open No. 2005-107322 has proposed an image forming apparatus which prepares two timings, namely the timing detected by a paper bundle detection sensor and the timing when the button is pressed, each as the execution timing of manual stapling, and allows the user to switch between the timings.

However, the above related art has the following problems. For example, when performing manual stapling, the user occupies the post-processing apparatus. If, therefore, a printing paper sheet on which an image forming apparatus has printed is conveyed to the post-processing apparatus in the manual staple mode, the paper sheet collides with the bundle of paper sheets to be manually stapled, thus causing jam. For this reason, it is necessary to execute exclusive processing such as inhibiting the image forming apparatus from printing during manual stapling or inhibiting manual stapling during printing by the image forming apparatus.

When inhibiting printing during the manual staple mode, maintaining the manual staple mode may inhibit the apparatus from transiting to the print mode, thereby inhibiting the apparatus from executing printing. In an office, in particular, a plurality of users share one image forming apparatus. For this reason, some user may execute manual stapling while another user wants to execute printing. When the apparatus maintains the manual staple mode, another user cannot execute printing as long as the mode is maintained. For example, when performing PDL printing, the user is likely to input a job from a place remote from the image forming apparatus. The user foresees the time when printing is complete upon inputting of a job, and moves to a position in front of the image forming apparatus. However, the apparatus may not perform printing due to the manual staple mode.

SUMMARY OF THE INVENTION

The present invention enables realization of a mechanism for limiting the formation of an image by an image forming unit and canceling a mode for permitting the execution of post-processing by a post-processing unit in accordance with set conditions.

One aspect of the present invention provides an image forming apparatus comprising: an image forming unit configured to form an image on a sheet; a post-processing unit configured to execute post-processing for a sheet; a changing unit configured to change a mode of the image forming apparatus from a first mode of permitting formation of an image by the image forming unit to a second mode of restricting formation of an image by the image forming unit and permitting the post-processing unit to execute post-processing; a setting unit configured to set, as a condition for changing the mode of the image forming apparatus from the second mode to the first mode, a first condition for changing the mode of the image forming apparatus without a user instruction for changing the mode from the second mode to the first mode or a second condition for changing the mode of the image forming apparatus in accordance with the user instruction; and a control unit configured to control to change the mode of the image forming apparatus from the second mode to the first mode in accordance with the condition set by the setting unit.

Another aspect of the present invention provides an image forming apparatus control method of controlling an image forming unit and a post-processing unit, the method comprising: changing a mode of the image forming apparatus from a first mode of permitting formation of an image by the image forming unit to a second mode of restricting formation of an image by the image forming unit and permitting the post-processing unit to execute post-processing; causing the image forming apparatus to transit to a mode of limiting formation of an image by the image forming unit and permitting the post-processing unit to execute post-processing; setting, as a condition for changing the mode of the image forming apparatus from the second mode to the first mode, a first condition for changing the mode of the image forming apparatus without a user instruction for changing the mode from the second mode to the first mode or a second condition for changing the mode of the image forming apparatus in accordance with the user instruction; and controlling to change the mode of the image forming apparatus from the second mode to the first mode in accordance with the set condition.

Still another aspect of the present invention provides a non-transitory computer-readable storage medium storing a computer program for causing a computer to execute each step in the image forming apparatus control method.

Further features of the present invention will be apparent from the following description of exemplary embodiments with reference to the attached drawings.

BRIEF DESCRIPTION OF THE DRAWINGS

FIGS. 7A and 7B are flowcharts showing a processing procedure by the controller 110 according to the embodiment.

DESCRIPTION OF THE EMBODIMENTS

Figure 1:
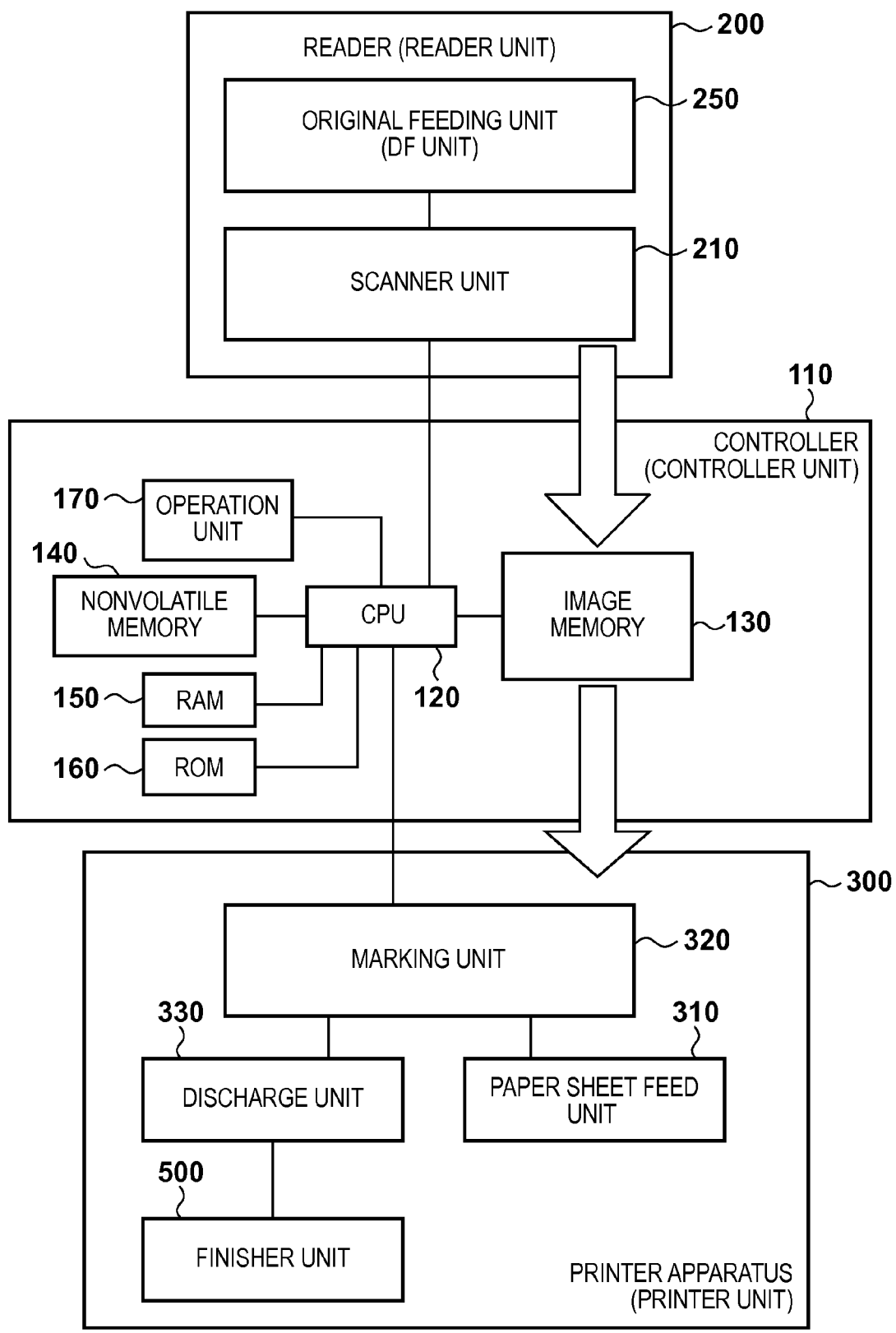
FIG. 1 is a block diagram showing the arrangement of an image forming apparatus according to an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

The best mode of carrying out the present invention will be described below with reference to FIGS. 1 to 7. The overall arrangement of an image forming apparatus according to an embodiment of the present invention will be described first with reference to FIG. 1.

Reference numeral 200 denotes an image reader (image input apparatus) which optically reads an original image and converts it into image data. The image reader 200 includes a scanner unit 210 having a function of reading an original and an original feeding unit (DF unit) 250 having a function of conveying an original paper sheet.

Reference numeral 300 denotes a printer unit (image output apparatus) which conveys a printing paper sheet (printing material), prints image data on the paper sheet as a visible image, and discharges the paper sheet out of the apparatus. The printer unit 300 includes a paper feed unit 310 including a plurality of types of printing paper cassettes and a marking unit 320 having a function of transferring and fixing image data onto a printing paper sheet. The printer unit 300 further includes a discharge unit 330 having a function of outputting a printed printing paper sheet outside the apparatus and a finisher unit 500 which performs staple processing and sort processing.

A controller 110 includes a CPU 120, an image memory 130, a nonvolatile memory 140, a RAM 150, a ROM 160, and an operation unit 170. The controller 110 is electrically connected to the image reader 200 and the printer unit 300. The CPU 120 in the controller 110 provides a copy function of controlling the reader 200 to store the image data of an original in the image memory 130 and controlling the printer unit 300 to output image data in the image memory 130 onto a printing paper sheet.

The nonvolatile memory 140 stores various types of adjustment values. The RAM 150 is used as a work area for the CPU 120. The ROM 160 stores control programs for the CPU 120. The operation unit 170 includes a liquid crystal display unit, a touch panel input device attached on the liquid crystal display unit, and a plurality of hard keys. A signal input with the touch panel or hard key is transmitted to the CPU 120 to display, on the liquid crystal display unit, a function indication, image data, or the like for the operation of this image forming apparatus.

<Arrangement of Reader Unit and Printer Unit>

Figure 2:
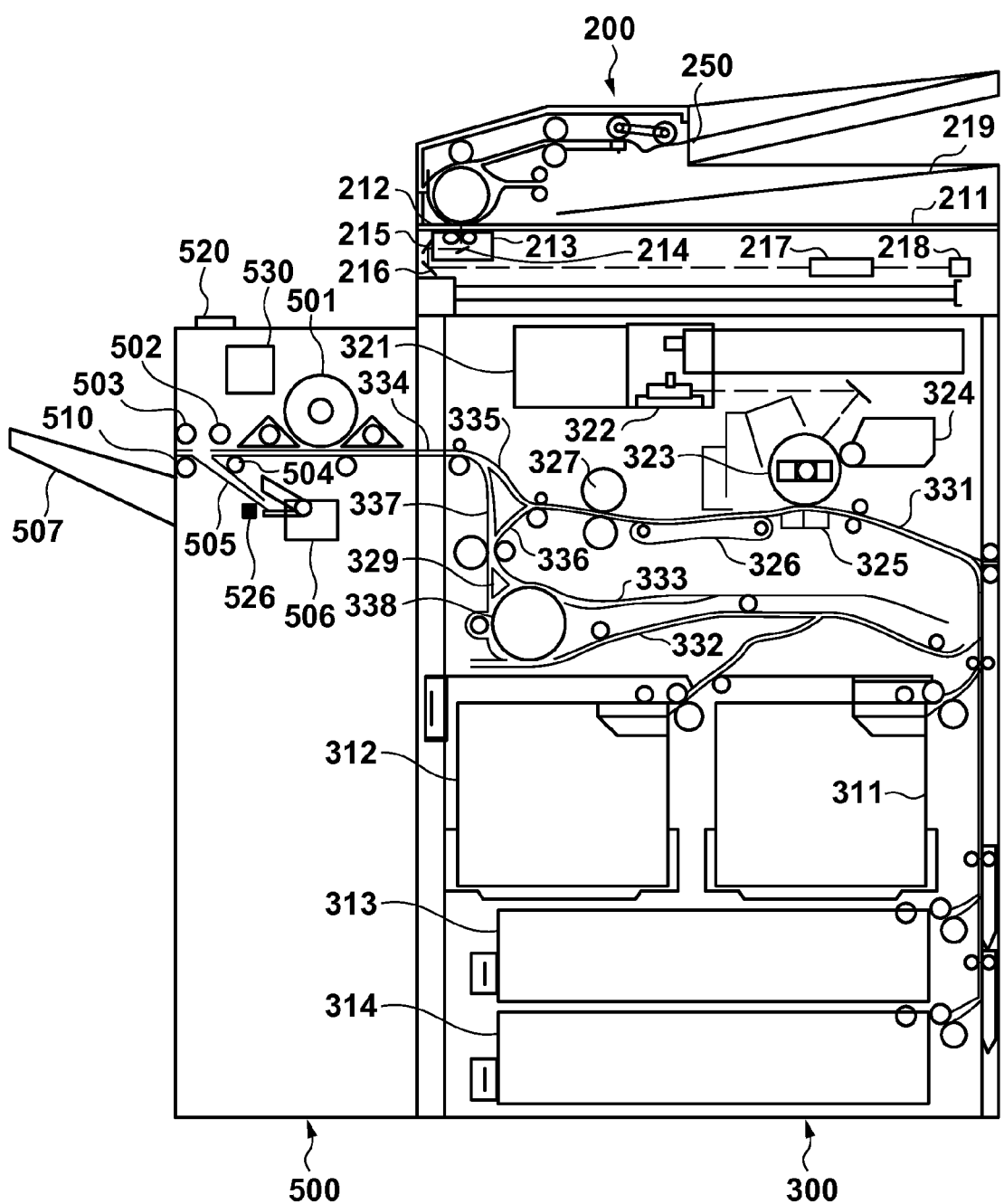
FIG. 2 is a sectional view showing a reader unit and a printer unit according to the embodiment.

The reader 200, the printer unit 300, and the finisher unit 500 in this embodiment will be described next with reference to FIG. 2. The reader 200 will be described first.

In the image reader 200, the original feeding unit (feeder) 250 feeds originals onto a platen glass 211 one by one sequentially from the start, and discharges originals having undergone read operation on the platen glass 211 onto a discharge tray 219. When an original is conveyed onto the platen glass 211, the image reader 200 turns on a lamp 212 and starts to move an optical unit 213 to exposure/scan the original. The reflected light from the original at this time is guided to a CCD image sensor (to be referred to as a CCD hereinafter) 218 by mirrors 214, 215, and 216 and a lens 217. The CCD 218 reads an image on the scanned original. The image data output from the CCD 218 is transferred to the controller 110 upon having undergone predetermined processing.

The printer unit 300 will be described next. In the printer unit 300, a laser driver 321 drives a laser emission unit 322 to emit laser light in accordance with the image data output from the controller 110. This laser light irradiates a photosensitive drive 323 to form a latent image on it in accordance with the laser light. A developing device 324 attaches a developer on the latent image portion of the photosensitive drive 323.

The printer unit 300 includes cassettes 311, 312, 313, and 314 in the form of drawers constituting the paper feed unit 310. The user pulls out each paper feed cassette, replenishes the cassette with paper sheets, and closes the cassette, thereby performing paper sheet replenishment. The printer unit 300 feeds a printing paper sheet from one of the cassettes 311, 312, 313, and 314 and conveys the paper sheet to a transfer unit 325 through a conveyance path 331. The transfer unit 325 transfers the developer attached to the photosensitive drive 323 onto the printing paper sheet. A conveyor belt 326 conveys the printing paper sheet on which the developer has been transferred to a fixing unit 327. In this case, the developer is fixed on the printing paper sheet with the heat and pressure of the fixing unit 327. Thereafter, the printing paper sheet passing through the fixing unit 327 is discharged outside the image forming apparatus through conveyance paths 335 and 334. Alternatively, when discharging the paper sheet upon reversing its printed surface, the printer unit 300 guides the paper sheet to conveyance paths 336 and 338, conveys the printing paper sheet in the reverse direction, and discharges the paper sheet through conveyance paths 337 and 334.

When the user has set the double-sided formation (double-sided printing) mode, the apparatus guides a printing paper sheet which has passed through the fixing unit 327 from the conveyance path 336 to a conveyance path 333 by a flapper 329, conveys the paper sheet in the reverse direction thereafter, and guides the paper sheet to the conveyance path 338 and a re-feed conveyance path 332 by the flapper 329. The printing paper sheet guided to the re-feed conveyance path 332 passes through the conveyance path 331 at the above timing and is fed to the transfer unit 325. The printing paper sheet discharged onto the conveyance path 334 is conveyed to the finisher unit 500 regardless of whether the apparatus is set in the single-sided or double-sided formation mode.

The finisher unit 500 will be described next. The following will exemplify the apparatus having a staple function as a post-processing unit. However, the present invention is not limited to this. For example, the post-processing unit may be configured to execute functions such as book binding, pasting, folding, and punching. The printing paper sheet conveyed to the finisher unit 500 is sent first to a buffer unit 501. In this case, the apparatus performs buffering by winding a conveyed printing paper sheet around a buffer roller depending on the situation. If, for example, it takes much time to perform processing like stapling on the downstream side of the buffer roller, it is possible to keep the conveying velocity of each printing paper sheet conveyed from the main body by using the buffer unit. This helps to increase the throughput. The printing paper sheet is then discharged onto a discharge tray 507 through an upstream discharge roller pair 502, a downstream discharge roller pair 503, and a discharge port 510.

In the staple mode (second mode), a printing paper sheet is pulled back by a knurling belt 504 and discharged onto a stack tray 505 immediately after the trailing end of the printing paper sheet conveyed by the upstream discharge roller pair 502 passes through it. After a staple unit 506 performs staple processing for a predetermined number of printing paper sheets stacked on the tray, the downstream discharge roller pair 503 discharges the printing paper sheets to the discharge tray 507. In addition, in the transit sort mode, the apparatus discharges paper sheets stacked on the stack tray onto the discharge tray 507 upon transiting them to the left and right, thereby expressing the boundaries between the respective copies.

In general, the apparatus executes stapling upon stacking printing paper sheets discharged from the conveyance path 334 onto the stack tray 505. Alternatively, the apparatus operates in the manual staple mode, in which when the user inserts a bundle of paper sheets in the stack tray 505 and a paper bundle detection sensor 526 detects the bundle of paper sheets, the staple unit 506 staples the bundle of paper sheets on the stack tray 505. When the user presses a button 520 on the finisher unit 500, the apparatus transits to this manual staple mode. In addition, the apparatus is provided with a human sensor 530 which detects the presence of a person in front of the finisher unit 500. Assume that the apparatus has transited to the manual staple mode. In this case, when the human sensor 530 detects a person first and then detects no person, the apparatus may transit from the manual staple mode to the general print mode (first mode).

In this embodiment, in the first mode, the apparatus can execute normal printing operation. In the second mode, the printer unit 300 stops, and only the finisher unit 500 can perform operation. For this reason, the apparatus cannot execute printing during the second mode. If, therefore, the user forgets to return the second mode to the first mode, the apparatus is kept disabled to execute printing. For this reason, in order to prevent this, the image forming apparatus according to the embodiment incorporates a preventive measure to be described later.

<Operation Unit>

Figure 3:
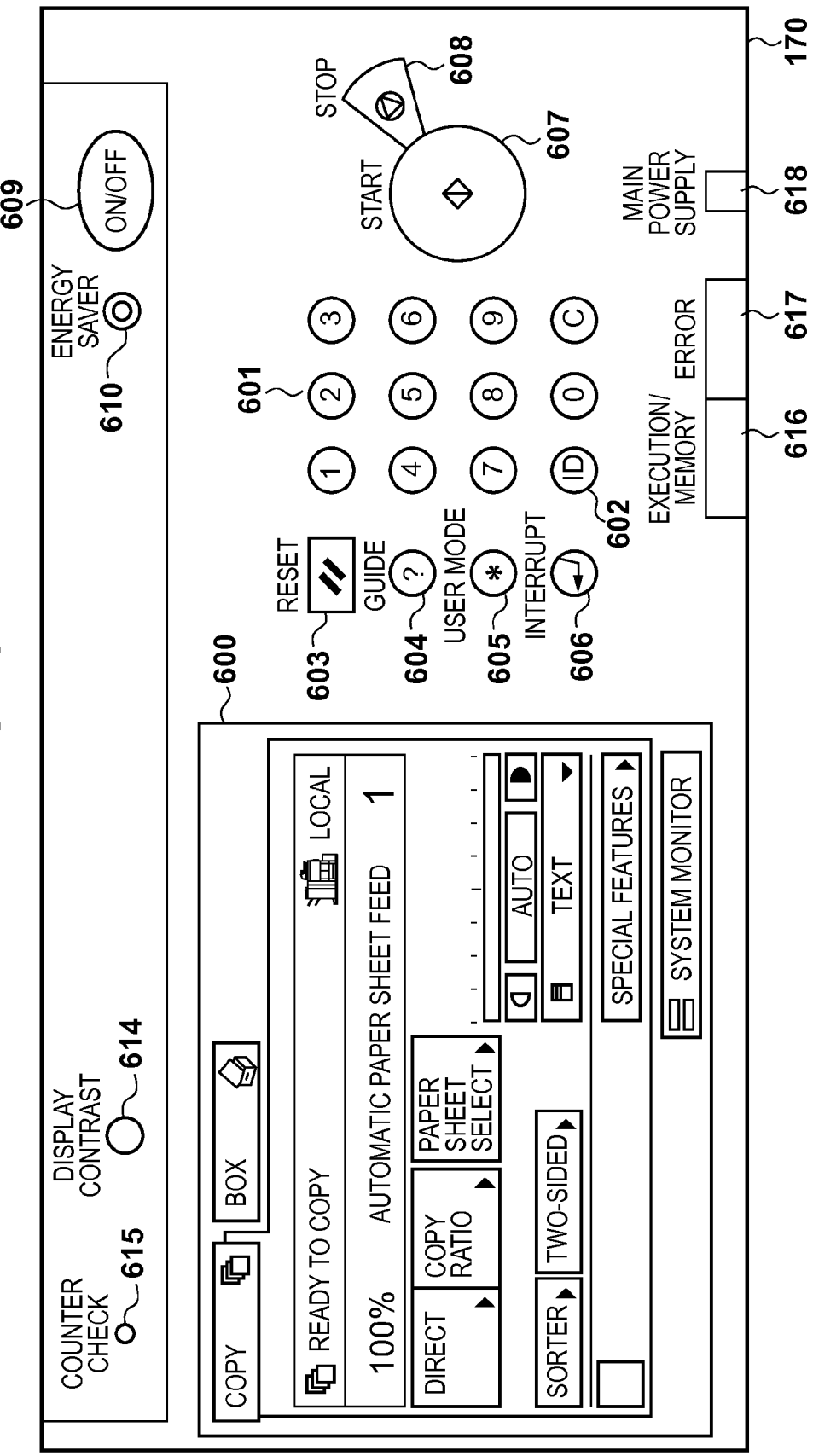
FIG. 3 is a view showing an operation unit according to the embodiment.

The operation unit 170 shown in FIG. 1 will be described with reference to FIG. 3. Reference numeral 600 denotes an LCD touch panel on which the user performs main mode setting and status display; 601, a ten-key pad which inputs numerical values of 0 to 9; and 602, an ID key which is used by the user to input a department number and a secret mode when the apparatus is managed in each department.

Reference numeral 603 denotes a reset key for resetting a set mode; 604, a guide key for displaying an explanatory window for each mode; 605, a user mode key for entering a user mode window; and 606, an interrupt key for performing interrupt copy.

Reference numeral 607 denotes a start key for starting copy operation; 608, a stop key for stopping a copy job under execution; 609, a soft power SW which is pressed to make the apparatus transit to a low power state by turning off the backlight of the LCD touch panel 600; and 610, a power saving key which is pressed to enter a power saving state and is pressed again to return from the power saving state.

Reference numeral 614 denotes an adjustment key for adjusting the contrast of the LCD touch panel; 615, a counter check key which is pressed to display, on the LCD, a count window which displays the total number of copies used so far; 616, an LED indicating that image data is being stored in an image memory during the execution of a job; 617, an error LED indicating that the apparatus is in an error state such as a jam or door open state; and 618, a power LED indicating that the main switch of the apparatus is ON.

<Procedure for Manual Stapling>

Figure 4:
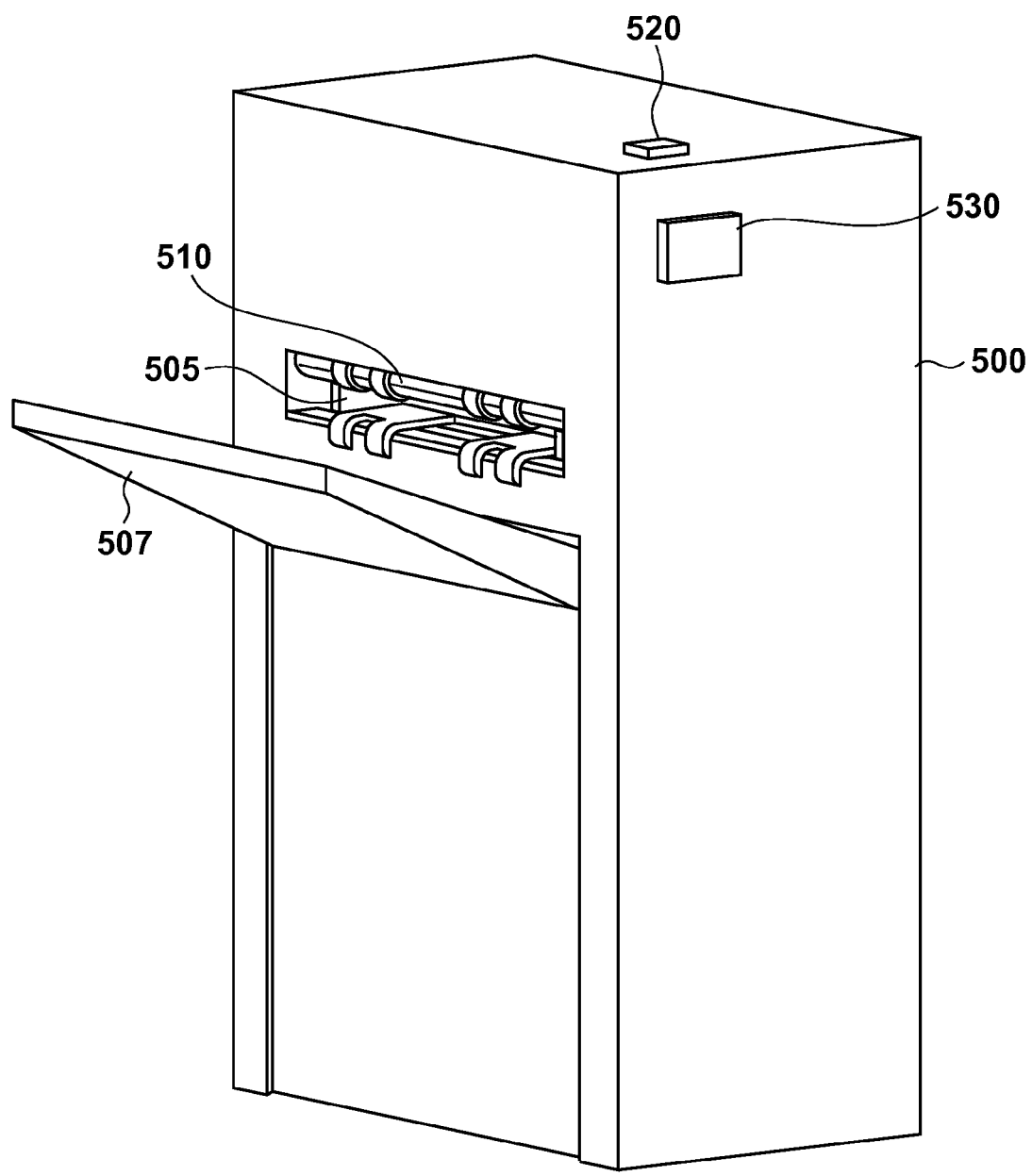
FIG. 4 is a perspective view showing a finisher unit 500 according to the embodiment.

A procedure for manual stapling will be described next with reference to FIG. 4. FIG. 4 shows the outer appearance of the finisher unit 500. First of all, the user stands in front of the finisher unit 500 while holding a bundle of paper sheets. The user then presses the button 520 of the finisher unit 500 (user input). While the image forming apparatus is performing printing, the apparatus neglects the pressing of the button 520. This is because while the apparatus is performing printing, the printed paper sheet output from the discharge port 510 of the finisher unit collides with a bundle of paper sheets to be manually stapled.

While the apparatus is not performing printing, the apparatus transits to the manual staple mode, and the user can occupy the finisher unit 500 for manual stapling. The user inserts a bundle of paper sheets to be stapled into the stack tray 505 through the discharge port 510 with respect to the finisher unit 500 which has transited to the manual staple mode. As shown in FIG. 2, the finisher unit 500 includes the paper bundle detection sensor 526 which is placed near the staple unit 506 and detects that the user has inserted a bundle of paper sheets onto the stack tray 505. When the paper bundle detection sensor 526 detects a bundle of paper sheets, the staple unit 506 staples the bundle of paper sheets on the stack tray 505.

Since the apparatus cannot perform printing during the manual staple mode, it is necessary to return from the manual staple mode to the normal print mode upon completion of manual stapling. Methods of returning from the manual staple mode to the normal print mode include three patterns. In the first pattern, when the user manually staples one bundle of paper sheets (complete one process), the apparatus immediately returns from the manual staple mode to the normal print mode. In the second pattern, the user presses the button 520 to return from the manual staple mode to the normal print mode. In the third pattern, when the human sensor 530 on the finisher unit 500 detects that a person has left the finisher unit 500, the apparatus returns from the manual staple mode to the normal print mode.

The operator may press the button 520 to switch between the first and second patterns. More specifically, when transiting to the manual staple mode, the apparatus may operate in the second pattern if a time period which the button 520 is pressed by the user is not less than a predetermined time; otherwise, the apparatus may operate in the first pattern. As another method, the apparatus may operate in the second pattern if a manual staple button which is different from the button 520 is pressed, the apparatus may operate in the first pattern if the button 520 is pressed.

Information to be stored in the RAM 150 of the controller 110 will be described next with reference to FIG. 5. The present invention prepares a flag 8000 indicating a plural bundle manual staple mode in the RAM 150 to let the CPU 120 determine whether the apparatus operates in the first pattern or the second pattern. The flag 8000 is turned on if the user presses the button 520 long in the second pattern. Otherwise in the first pattern, the flag is turned off.

Display control by the controller 110 of the operation unit 170 during the manual staple mode will be described next with reference to FIG. 6. When the user presses the button 520 and the controller 110 transits to the manual staple mode, the controller 110 displays a manual stapling dialog 6000 on the operation unit 170. The manual stapling dialog 6000 displays a content indicating that the apparatus cannot currently execute printing because the manual staple mode is set. This allows the user to confirm that the apparatus has transited to the manual staple mode and cannot perform printing during the manual staple mode. Note that this information may be displayed on the display screen of an external apparatus connected to the image forming apparatus via a network. For example, the controller 110 performs control to display the above information on the display screen of the printer driver of the image forming apparatus which is installed in a PC or the like.

<Processing Procedure>

Figure 7A:
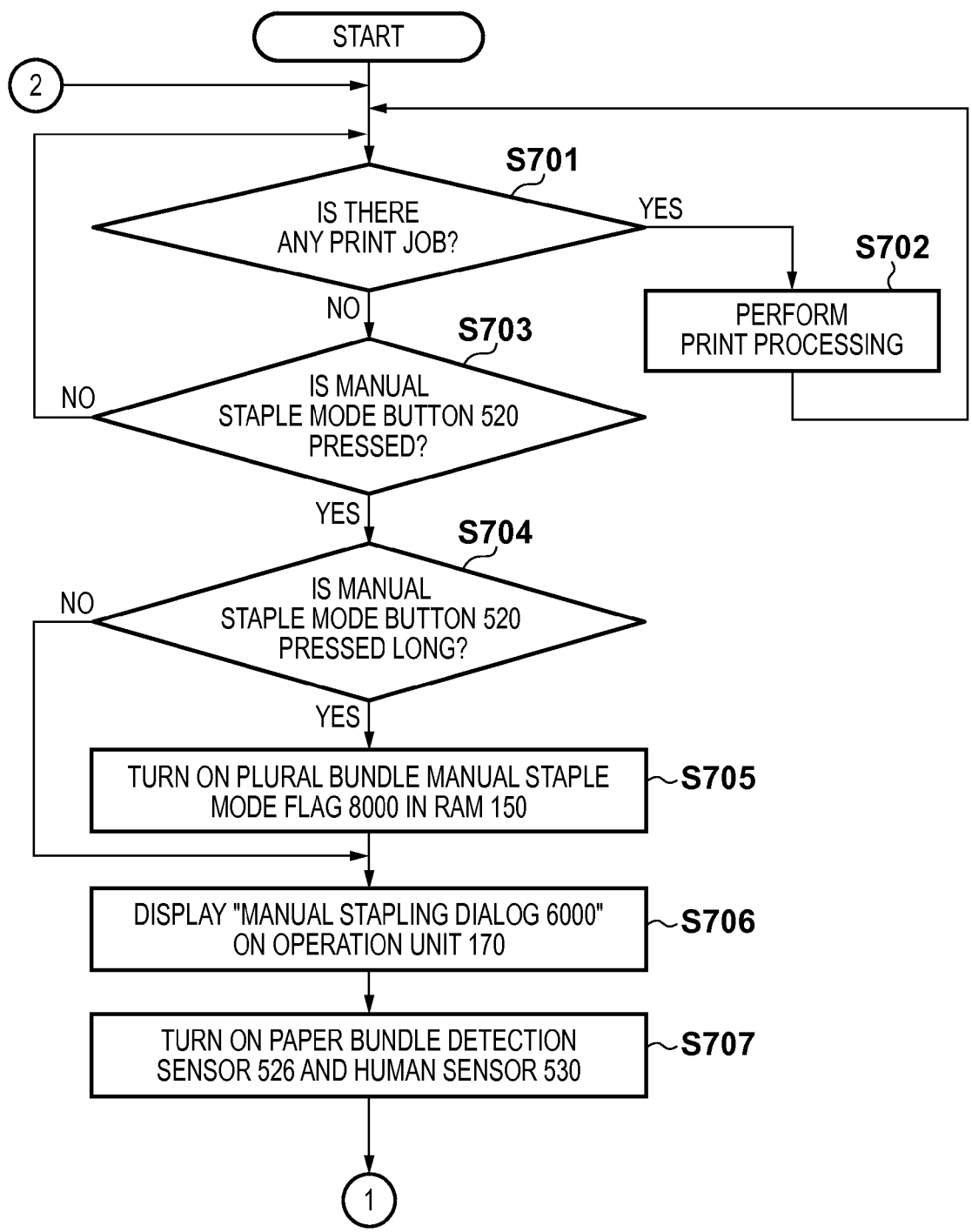

A processing procedure by the controller 110 according to this embodiment will be described next with reference to the flowcharts of FIGS. 7A and 7B. The processing to be described below is implemented by causing the CPU 120 to read a control program stored in the ROM 160, nonvolatile memory 140, or the like into the RAM 150 and execute the program.

In step S701, the CPU 120 determines whether there is a print job. If there is a print job, the process advances to step S702. If there is no print job, the process advances to step S703. In step S702, the CPU 120 prints the print job detected in step S701. When the apparatus completes print processing, the process transits to step S701 again. That is, even if the user presses the button 520 during printing, the controller 110 neglects the button operation and does not transit to the manual staple mode.

In step S703, the CPU 120 determines whether the user has pressed the button 520. If the user has pressed the button 520, the process advances to step S704. If the user has not pressed the button 520, the process returns to step S701. In step S704, the CPU 120 determines whether the user has pressed the button 520 long. If the user has pressed the button 520 long, the process advances to step S705. If the user has not pressed the button 520 long, the process advances to step S706. When determining whether the user has pressed the button 520 long, the apparatus measures the time between the instant the pressing of the button 520 is detected and the instant the user presses the button 520, by using a timer or the like, and the CPU 120 determines that the user has pressed the button long, if the measured time exceeds a predetermined time period.

Figure 5:
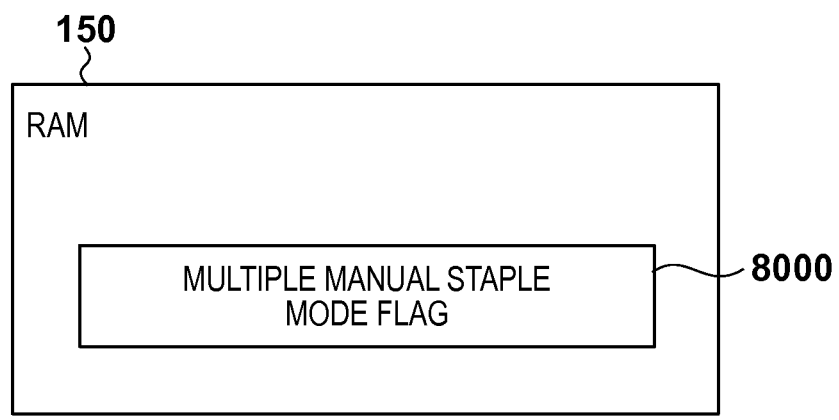
FIG. 5 is a view showing a plural bundle manual staple mode flag in a RAM 150 in a controller 110 according to the embodiment.

In step S705, since the CPU 120 determines in step S704 that the user has pressed the button 520 long, the CPU 120 turns on the flag 8000 in the RAM 150 shown in FIG. 5. In this case, the CPU 120 determines that the pattern in which the apparatus returns from the second mode to the first mode is the second pattern. If the user has not pressed the button 520 long (short press), the CPU 120 determines this pattern as the first pattern. This is because, since the user has pressed the button 520 long, the CPU 120 determines that the user has selected the second pattern in which the apparatus transits from the manual staple mode.

Figure 6:
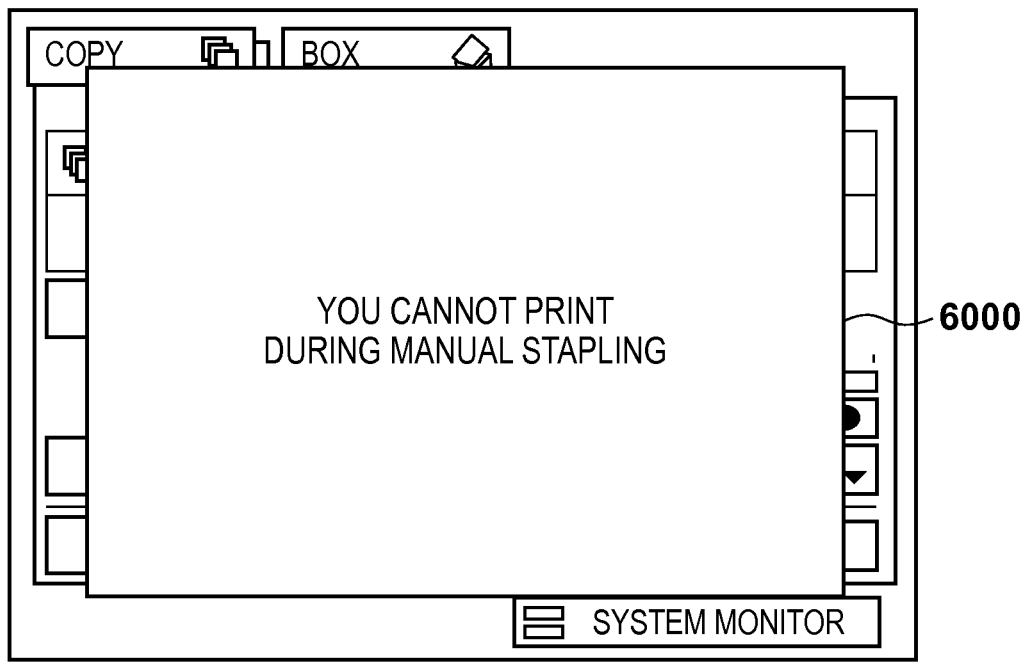
FIG. 6 is a view showing a manual stapling dialog 6000 displayed on an operation unit 170 according to the embodiment.

In step S706, the CPU 120 displays the manual stapling dialog 6000 shown in FIG. 6 on the operation unit 170. The process then advances to step S707. In step S707, the CPU 120 activates the paper bundle detection sensor 526 and the human sensor 530 in the finisher unit 500. The process then advances to step S708. In step S708, the CPU 120 causes the paper bundle detection sensor 526 in the finisher unit 500 to detect a bundle of paper sheets. If the paper bundle detection sensor 526 can detect a bundle of paper sheets, the process advances to step S709. If the paper bundle detection sensor 526 detects no bundle of paper sheets, the process advances to step S711.

In step S709, the CPU 120 operates the staple unit 506 to execute staple processing for the bundle of paper sheets, and the process advances to step S710. In step S710, the CPU 120 determines whether the flag 8000 stored in the RAM 150 shown in FIG. 5 is ON. If the flag is ON, the process advances to step S708. If the flag is OFF, the process advances to step S713.

If the paper bundle detection sensor 526 detects no bundle of paper sheets in step S708, the CPU 120 determines in step S711 whether the user has pressed the button 520. If the user has pressed the button 520, the process advances to step S713 to transit from the manual staple mode. If the user has not pressed the manual staple mode button, the process advances to step S712. In step S712, the CPU 120 causes the human sensor 530 provided in the finisher unit 500 to detect whether any person is present in front of the finisher unit 500. If there is a person in front of the finisher unit 500, the process advances to step S708. If no person is present, the process advances to step S713.

In step S713, the CPU 120 turns off the paper bundle detection sensor 526 and the human sensor 530 in the finisher unit 500. The process then advances to step S714. In step S714, the CPU 120 hides the manual stapling dialog 6000 shown in FIG. 6 on the operation unit 170. The process then advances to step S715. In step S715, the CPU 120 turns off the flag 8000 stored in the RAM 150 shown in FIG. 5. The process returns to step S701 to transit to the initial state.

As has been described above, the image forming apparatus according to this embodiment prepares a plurality of patterns as patterns in which the apparatus transits from the manual staple mode to the normal print mode, and suitably switch between the patterns. For example, the apparatus has the first pattern in which the apparatus returns to the print mode immediately after the user manually staples one bundle of paper sheets and the second pattern in which the apparatus returns to the print mode when the user presses the button 520. In addition, it is possible to provide the third pattern in which the apparatus returns to the print mode when the human sensor 530 in the finisher unit 500 detects that a person has left the finisher unit 500. This makes it possible to implement user-friendly exclusive access control between the manual staple mode and the print mode.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268807 filed on Dec. 7, 2012, which is hereby incorporated by reference herein in its entirety.

What is claimed is:

1. An image forming apparatus comprising:
an image forming unit configured to form an image on a sheet;
a post-processing unit configured to execute post-processing for a sheet;
a changing unit configured to change a mode of the image forming apparatus from a first mode of permitting formation of an image by the image forming unit to a second mode of restricting formation of an image by the image forming unit and permitting the post-processing unit to execute post-processing;
a setting unit configured to set, as a condition for changing the mode of the image forming apparatus from the second mode to the first mode, a first condition for changing the mode of the image forming apparatus without a user instruction for changing the mode from the second mode to the first mode or a second condition for changing the mode of the image forming apparatus in accordance with the user instruction; and a control unit configured to control to change the mode of the image forming apparatus from the second mode to the first mode in accordance with the condition set by the setting unit.

2. The apparatus according to claim 1, wherein the control unit controls to change the mode of the image forming apparatus without the user instruction in accordance with completion of one execution of processing by the post-processing unit in a case where the first condition is set by the setting unit.

3. The apparatus according to claim 2, further comprising a detection unit provided near the post-processing unit and configured to detect a sheet inserted in the post-processing unit, wherein the control unit controls to change the mode of the image forming apparatus without the user instruction, in accordance with completion of one execution of processing by the post-processing unit after the detection unit detects insertion of a sheet in the post-processing unit in a case where the first condition is set by the setting unit.

4. The apparatus according to claim 1, wherein the changing unit changes the mode of the image forming apparatus from the first mode to the second mode in a case where a button for use of the post-processing unit is pressed, the control unit controls to change the mode of the image forming apparatus in accordance with pressing of the button in a case where the second condition is set by the setting unit.

5. The apparatus according to claim 1, wherein the changing unit changes the mode of the image forming apparatus from the first mode to the second mode in a case where a button for use of the post-processing unit is pressed, and the setting unit sets the first condition in a case where a time period which the button is pressed is less than a predetermined time, and the setting unit sets the second condition in a case where a time period which the button is pressed is not less than a predetermined time.

6. The apparatus according to claim 2, further comprising a sensor configured to perceive a person located in front of the image forming apparatus, wherein the control unit controls to change the mode of the image forming apparatus in a case where the sensor stops perceiving a person who has been perceived, after the mode of the image forming apparatus has been changed from the first mode to the second mode.

7. The apparatus according to claim 1, wherein the control unit controls a display unit to display a content indicating restriction of execution of image formation of the image forming apparatus while the mode of the image forming apparatus is the second mode.

8. The apparatus according to claim 1, wherein the post-processing unit staples a plurality of sheets.

9. An image forming apparatus control method of controlling an image forming unit and a post-processing unit, the method comprising:

changing a mode of the image forming apparatus from a first mode of permitting formation of an image by the image forming unit to a second mode of restricting formation of an image by the image forming unit and permitting the post-processing unit to execute post-processing;

causing the image forming apparatus to transit to a mode of limiting formation of an image by the image forming unit and permitting the post-processing unit to execute post-processing;

setting, as a condition for changing the mode of the image forming apparatus from the second mode to the first mode, a first condition for changing the mode of the image forming apparatus without a user instruction for changing the mode from the second mode to the first mode or a second condition for changing the mode of the image forming apparatus in accordance with the user instruction; and controlling to change the mode of the image forming apparatus from the second mode to the first mode in accordance with the set condition.

10. A non-transitory computer-readable storage medium storing a computer program for causing a computer to execute each step in an image forming apparatus control method defined in claim 9.

* * * * *